(12) United States Patent
Mandeville et al.

(10) Patent No.: US 12,654,190 B2
(45) Date of Patent: Jun. 16, 2026

(54) SYSTEM AND REFILLING STATION FOR AN AUTONOMOUS SPRAYING ROBOT

(71) Applicant: HUSQVARNA AB, Huskvarna (SE)

(72) Inventors: Ken Mandeville, Midland, NC (US); Chris Price, Charlotte, NC (US); Scott Kirkpatrick, Hickory, NC (US); James McClay, Charlotte, NC (US); Chad Fuhrman, Concord, NC (US); Andy Grayson, Matthews, NC (US)

(73) Assignee: HUSQVARNA AB, Huskvarna (SE)

( * ) Notice: Subject to any disclaimer, the term of this patent is extended or adjusted under 35 U.S.C. 154(b) by 848 days.

(21) Appl. No.: 18/011,562

(22) PCT Filed: Sep. 28, 2021

(86) PCT No.: PCT/US2021/052318
§ 371 (c)(1),
(2) Date: Dec. 20, 2022

(87) PCT Pub. No.: WO2022/115147
PCT Pub. Date: Jun. 2, 2022

(65) Prior Publication Data
US 2023/0226568 A1 Jul. 20, 2023

Related U.S. Application Data

(60) Provisional application No. 63/119,162, filed on Nov. 30, 2020.

(51) Int. Cl.
B05B 13/00 (2006.01)
B60L 53/36 (2019.01)
(Continued)

(52) U.S. Cl.
CPC ............ B05B 13/005 (2013.01); B60L 53/36 (2019.02); B60S 1/488 (2013.01); E01H 10/007 (2013.01); B60L 2260/32 (2013.01)

(58) Field of Classification Search
CPC ........ B05B 13/005; B60L 53/36; B60S 1/488; E01H 10/007
(Continued)

(56) References Cited

U.S. PATENT DOCUMENTS 9,284,703 B2 * 3/2016 Giletta .................... B60L 53/80
9,786,961 B2 * 10/2017 Dyer ..................... B60L 53/302
(Continued)

FOREIGN PATENT DOCUMENTS

CN 207594791 U 7/2018
CN 207793998 U 8/2018
(Continued)

OTHER PUBLICATIONS

Law, "New SwarmFarm mini robotic sprayers to revolutionise farm machinery thinking", https://www.weeklytimesnow.com.au/machine/new-swarmfarm-mini-robotic-sprayers-to-revolutionise-farm-machinery-thinking/news-story/f447617b5b332fbe97068a78b68c7fc0, Feb. 10, 2016, 2 Pages.
(Continued)

*Primary Examiner* — Richard V Muralidar
(74) *Attorney, Agent, or Firm* — Burr & Forman

(57) ABSTRACT

A robotic vehicle (10) charging station (40) may include a charge interface configured to charge a battery (210) of a robotic vehicle (10) responsive to docking of the robotic vehicle (10) at the charging station (40), and a mixing assembly (240) configured to facilitate mixing a solid material and a liquid to form an aqueous solution for provision to a storage tank (14) of the robotic vehicle.

20 Claims, 7 Drawing Sheets

(51) Int. Cl.
  B60S 1/48          (2006.01)
  E01H 10/00         (2006.01)

(58) Field of Classification Search
  USPC ........................................................ 320/109
  See application file for complete search history.

(56)                    References Cited

U.S. PATENT DOCUMENTS

| | | | |
|---|---|---|---|
| 9,914,436 B2 | 3/2018 | Almalk | |
| 2008/0023573 A1* | 1/2008 | Ossian | E01H 10/007 |
| | | | 239/722 |
| 2011/0178635 A1* | 7/2011 | Anderson | E01H 1/00 |
| | | | 700/253 |
| 2018/0143634 A1 | 5/2018 | Ott et al. | |
| 2019/0090472 A1 | 3/2019 | Crinklaw et al. | |
| 2020/0121153 A1 | 4/2020 | Letsky | |
| 2023/0228052 A1* | 7/2023 | Mandeville | B05B 12/00 |
| | | | 239/754 |
| 2023/0256462 A1* | 8/2023 | Mandeville | B05B 12/085 |
| | | | 239/172 |

FOREIGN PATENT DOCUMENTS

| | | |
|---|---|---|
| CN | 108755553 A | 11/2018 |
| CN | 109594517 A | 4/2019 |
| CN | 110258429 A | 9/2019 |
| CN | 209663836 U | 11/2019 |
| CN | 110876367 A | 3/2020 |
| KR | 1981196 B1 | 5/2019 |
| WO | 2016/097892 A1 | 6/2016 |

OTHER PUBLICATIONS

McCullough, "High tech machinery crucial for the future", https://www.producer.com/crops/high-tech-machinery-crucial-for-the-future/, Nov. 21, 2019, 4 Pages.
International Search Report and Written Opinion for International Application No. PCT/US2021/052318 mailed Feb. 22, 2022.

* cited by examiner

SYSTEM AND REFILLING STATION FOR AN AUTONOMOUS SPRAYING ROBOT

TECHNICAL FIELD

Example embodiments generally relate to robotic vehicles and, more particularly, relate to a system and charging or refilling station for a robotic vehicle that sprays fluid over a specific area (e.g., for de-icing, fertilization, vegetation control, etc.) in an automated fashion.

BACKGROUND

Grounds maintenance tasks are commonly performed using various tools and/or machines that are configured for the performance of corresponding specific tasks. Certain tasks, like snow or ice removal, are typically performed using manually operated tools or vehicles. More recently, robotic devices and/or remote controlled devices have also become options for consumers to consider. In a de-icing context, the robotic device would typically spread rock salt over a surface that is intended to be cleared. However, salt can damage vegetation and other surfaces or objects that come into contact with the rock salt. Moreover, spreading rock salt is not easy to control, so the potential for undesirable or unforeseeable damage is further expanded.

Accordingly, it may be desirable to provide additional options for servicing or maintaining grounds that overcome some of the difficulties described above.

BRIEF SUMMARY OF SOME EXAMPLES

Some example embodiments may therefore provide a robotic vehicle charging station. The robotic vehicle charging station may include a charge interface configured to charge a battery of a robotic vehicle responsive to docking of the robotic vehicle at the charging station, and a mixing assembly configured to facilitate mixing a powder (or other solid material that is dissolvable) and a liquid to form a deicing solution for provision to a storage tank of the robotic vehicle. The mixing assembly may include a valve assembly having a plurality of alignment states. The alignment states may include a fill alignment in which liquid from an external source is provided to the mixing assembly to be mixed with a powder to form the deicing solution, and a mixing alignment in which the deicing solution is agitated or mixed.

In another example embodiment, a robotic vehicle charging station may be provided that includes a charge interface configured to charge a battery of a robotic vehicle responsive to docking of the robotic vehicle at the charging station, and a mixing assembly configured to facilitate mixing a solid material and a liquid to form an aqueous (e.g., deicing) solution for provision to a storage tank of the robotic vehicle. The mixing assembly may include a valve assembly operably coupled to a mix tank in which the solid material and the liquid are mixed prior to provision to the storage tank of the robotic vehicle. The valve assembly may control provision of the liquid into and out of the mix tank. The mixing assembly may further include a pump configured to facilitate mixing of the solid material and the liquid in the mix tank.

In still another example embodiment, a robotic vehicle charging station may be provided that includes a charge interface configured to charge a battery of a robotic vehicle responsive to docking of the robotic vehicle at the charging station, a mix tank inside which an aqueous solution is stored prior to transfer of the aqueous solution to a storage tank of the robotic vehicle, a pump, and a valve assembly operably coupled to a mix tank and the pump to facilitate recirculation of the aqueous solution from a bottom of the mix tank to a top portion of the mix to prevent freezing of the aqueous solution or maintain mixing of the aqueous solution.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
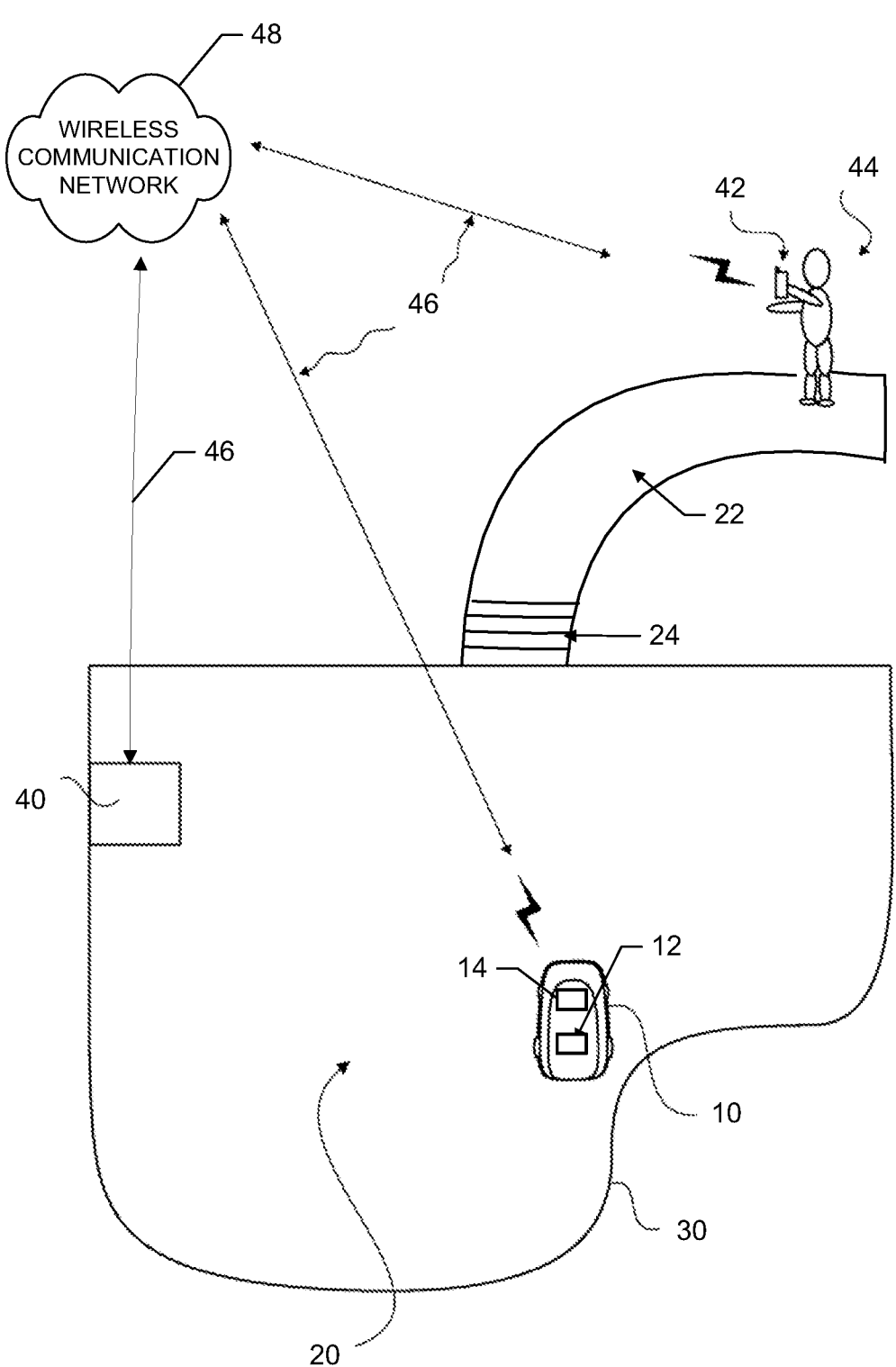
FIG. 1 illustrates an example operating environment for a robotic vehicle of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

A robotic deicer, may be an example of a robotic vehicle capable of performing deicing functions over an area that is defined by a boundary or other means. The robotic deicer may be configured to apply a deicing solution (i.e., not rock salt) within the boundary to ensure that the entire bounded area is relatively free of ice or snow. A boundary wire may be one way to define the boundary. However, since a boundary wire can be difficult to install in some areas, other strategies may be employed in some cases. For example, global positioning system (GPS), dead reckoning, local positioning beacons, physical boundaries or even visual fixing relative to various structural markers may alternatively be employed to locate and retain the robotic vehicle within the boundary. A robotic vehicle (e.g., a robotic deicer) may therefore be provided that can operate and stay within boundaries that can be defined by any of a number of different ways. Moreover, the robotic vehicle may be intelligent enough to avoid (and possibly even classify) objects it encounters by employing contactless sensors. Yet further, in some cases, the robotic vehicle may be configured to learn boundary locations, or sub-locations, based on temporary or permanent indicia. The robotic vehicle may then also be cognizant of its position within the boundary, including areas already covered (or treated) and areas still left to be covered (or treated). By enabling the robotic vehicle to accurately determine its position and experience its surroundings in a more advanced way, the robotic vehicle may experience greatly expanded capabilities with respect to the performance of functions of the robotic vehicle inside the bounded area. For example, the robotic vehicle may accurately apply deicing solution with greater precision both in terms of the rate or density of coverage, and with respect to matching application of deicing solution more accurately to the boundaries of the area being treated.

FIG. 1 illustrates an example operating environment for a robotic vehicle 10 that may be employed as a deicing robot in connection with an example embodiment. However, it should be appreciated that example embodiments may be employed on numerous other robotic vehicles, so the robotic vehicle 10 should be recognized as merely one example of such a vehicle. The robotic vehicle 10 may operate to apply a deicing solution on a service area 20 (i.e., a parking lot, walkway or other surface) enclosed by a boundary 30. The boundary 30 may be defined using one or more physical boundaries (e.g., a fence, wall, curb, boundary wire and/or the like), or programmed location based boundaries or combinations thereof. When the boundary 30 is detected, by any suitable means, the robotic vehicle 10 may be informed so that the robotic vehicle 10 can operate in a manner that prevents the robotic vehicle 10 from leaving or moving outside the boundary 30.

In the example of FIG. 1, the service area 20 includes a main portion, which may be a parking lot and a walkway 22. The walkway 22 is separated from the main portion of the service area 20 by a transition region 24, which in this case happens to be stairs. The stairs may not be traversable by the robotic vehicle 10 and may define an impassible region between the driving surface of the main portion, and the walking surface of the walkway. However, in other cases, the transition region 24 could be passable (e.g., forming a ramp or other surface).

The robotic vehicle 10 may be controlled, at least in part, via control circuitry 12 located onboard relative to the application of deicing fluid from a storage tank 14. The control circuitry 12 may include, among other things, a positioning module and a sensor module, which will be described in greater detail below. Accordingly, the robotic vehicle 10 may utilize the control circuitry 12 to define a path for coverage of the service area 20 in terms of performing a task over specified portions or the entire service area 20. In this regard, the positioning module may be used to guide the robotic vehicle 10 over the service area 20 and to ensure that full coverage (of at least predetermined portions of the service area 20) is obtained, while the sensor module may detect objects and/or gather data regarding the surroundings of the robotic vehicle 10 while the service area 20 is traversed.

If a sensor module is employed, the sensor module may include a sensors related to positional determination (e.g., a GPS receiver, an accelerometer, a camera, a radar transmitter/detector, an ultrasonic sensor, a laser scanner and/or the like). Thus, for example, positional determinations may be made using GPS, inertial navigation, optical flow, radio navigation, visual location (e.g., VSLAM) and/or other positioning techniques or combinations thereof. Accordingly, the sensors may be used, at least in part, for determining the location of the robotic vehicle 10 relative to boundaries or other points of interest (e.g., a starting point or other key features) of the service area 20, or determining a position history or track of the robotic vehicle 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the service area 20.

In an example embodiment, the robotic vehicle 10 may be battery powered via one or more rechargeable batteries. Accordingly, the robotic vehicle 10 may be configured to return to a charging station 40 that may be located at some position on the service area 20 in order to recharge the batteries. The batteries may power a drive system and a spray control system of the robotic vehicle 10. However, the control circuitry 12 of the robotic vehicle 10 may selectively control the application of power or other control signals to the drive system and/or the spray control system to direct the operation of the drive system and/or spray control system. Accordingly, movement of the robotic vehicle 10 over the service area 20 may be controlled by the control circuitry 12 in a manner that enables the robotic vehicle 10 to systematically traverse the service area 20 while operating the spray control system to apply deicing fluid stored in the robotic vehicle 10 over the service area 20. In cases where the robotic vehicle 10 is not a deicer, the control circuitry 12 may be configured to control another functional or working assembly that may replace the spray control system.

In some embodiments, the control circuitry 12 and/or a communication node at the charging station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic vehicle 10 via the electronic device 42, which may act as a remote control device for the robotic vehicle 10 or may receive data indicative or related to the operation of the robotic vehicle 10 to enable consumption of information or provision of instructions for the robotic vehicle 10 or charging station 40 at the electronic device 42. However, it should be appreciated that the wireless communication network 48 may include additional or internal components that facilitate the communication links and protocols employed. Thus, some portions of the wireless communication network 48 may employ additional components and connections that may be wired and/or wireless. For example, the charging station 40 may have a wired connection to a computer or server that is connected to the wireless communication network 48, which may then wirelessly connect to the electronic device 42. As another example, the robotic vehicle 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic vehicle 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
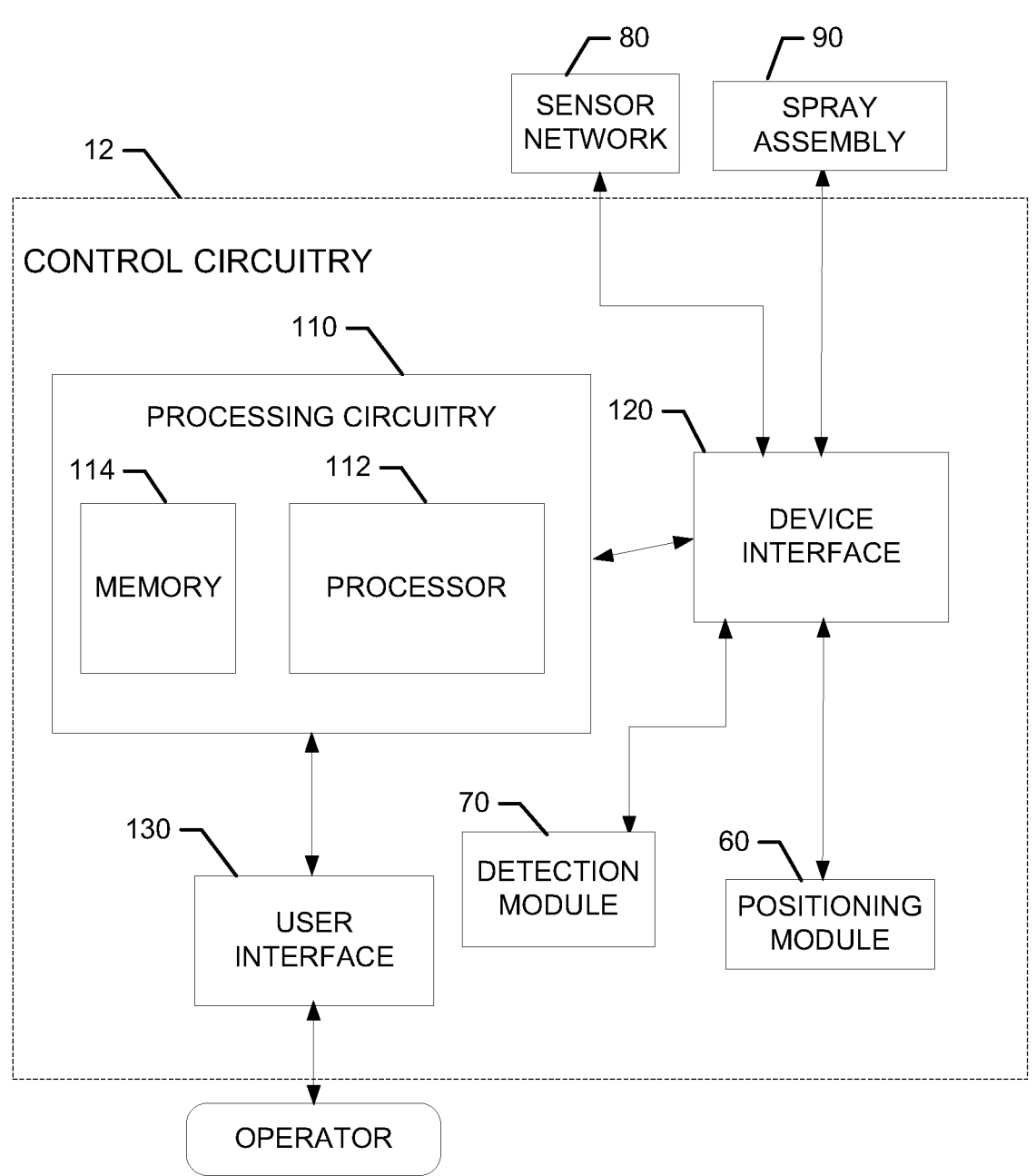
FIG. 2 illustrates a block diagram of various components of control circuitry to illustrate some of the components that enable or enhance the functional performance of the robotic vehicle and to facilitate description of an example embodiment.

FIG. 2 illustrates a block diagram of various components of the control circuitry 12 to illustrate some of the components that enable or enhance the functional performance of the robotic vehicle 10 and to facilitate description of an example embodiment. In some example embodiments, the control circuitry 12 may include or otherwise be in communication with a vehicle positioning module 60, and a detection module 70 (e.g., for detecting objects, borders and/or the like). The vehicle positioning module 60 and the detection module 70 may work together to give the robotic vehicle 10 a comprehensive understanding of its environment, and enable it to be operated autonomously with or without boundary wires.

In an example embodiment, the vehicle positioning module 60 and the detection module 70 may be part of a sensor network 80 of the robotic vehicle 10. However, in some cases, the vehicle positioning module 60 and the detection module 70 may be separate from, but in communication with, the sensor network 80 to facilitate operation of each respective module.

In some examples, the sensor network 80 may include a camera other imaging device, a moisture detector, and/or a thermometer or other ambient or surface temperature sensor. The camera may capture or record image data in the visible light spectrum or in other portions of the electromagnetic spectrum (e.g., IR camera). The robotic vehicle 10 may also include one or more functional components of a spray assembly 90 (described in greater detail below), which may be controlled by the control circuitry 12 or otherwise be operated in connection with the operation of the robotic vehicle 10. Although not shown in FIG. 2, other functional components of the robotic vehicle 10 may include a wheel assembly (or other mobility assembly components), a fluid tank (which may be part of the spray assembly), and/or other such devices.

The control circuitry 12 may include processing circuitry 110 that may be configured to perform data processing or control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic vehicle 10 via a single data bus. As such, the data bus may connect to a plurality or all of the switching components, sensory components and/or other electrically controlled components of the robotic vehicle 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the vehicle positioning module 60, the detection module 70, and the spray assembly 90. As such, in some embodiments, the processor 112 (or the processing circuitry 110) may be said to cause each of the operations described in connection with the vehicle positioning module 60, the detection module 70, and the spray assembly 90 by directing the vehicle positioning module 60, the detection module 70, and the spray assembly 90, respectively, to undertake the corresponding functionalities responsive to execution of instructions or algorithms configuring the processor 112 (or processing circuitry 110) accordingly. These instructions or algorithms may configure the processing circuitry 110, and thereby also the robotic vehicle 10, into a tool for driving the corresponding physical components for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the vehicle positioning module 60, the detection module 70, and the spray assembly 90 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic vehicle 10. Among the contents of the memory 114, applications may be stored for execution by the processor 112 in order to carry out the functionality associated with each respective application.

The applications may include applications for controlling the robotic vehicle 10 relative to various operations including determining an accurate position of the robotic vehicle 10 (e.g., using one or more sensors of the vehicle positioning module 60). Alternatively or additionally, the applications may include applications for controlling the robotic vehicle 10 relative to various operations including determining the existence and/or position of obstacles (e.g., static or dynamic) and borders relative to which the robotic vehicle 10 must navigate (e.g., using one or more sensors of the detection module 70). Alternatively or additionally, the applications may include applications for controlling the robotic vehicle 10 relative to various operations including application of deicing fluid over the service area 20 during operation of the robotic vehicle 10 relative to the service area 20.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data to/from the control circuitry 12, the vehicle positioning module 60, the detection module 70, the sensor network 80, the spray assembly 90 and/or other functional components via wired or wireless communication interfaces in a real-time manner, as a data package downloaded after data gathering or in one or more burst transmission of any kind.

Each of the vehicle positioning module 60 and the detection module 70 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 12 of the robotic vehicle 10. The modules may share some parts of the hardware and/or instructions that form each module, or they may be distinctly formed. As such, the modules and components thereof are not necessarily intended to be mutually exclusive relative to each other from a compositional perspective.

The vehicle positioning module 60 (or "positioning module") may be configured to utilize one or more sensors (e.g., of the sensor network 80) to determine a location of the robotic vehicle 10 and direct continued motion of the robotic vehicle 10 to achieve appropriate coverage of the service area 20. As such, the robotic vehicle 10 (or more specifically, the control circuitry 12) may use the location information to determine a vehicle track and/or provide full coverage of the service area 20 to ensure the entire parcel is sprayed (or otherwise serviced). The vehicle positioning module 60 may therefore be configured to direct movement of the robotic vehicle 10, including the speed and direction of the robotic vehicle 10. The vehicle positioning module 60 may also employ such sensors to attempt to determine an accurate current location of the robotic vehicle 10 on the service area 20. The vehicle positioning module 60 may further enable the control circuitry 12 to determine an amount of deicing fluid applied to each portion of the service area 20.

Various sensors of sensor network 80 of the robotic vehicle 10 may be included as a portion of, or otherwise communicate with, the vehicle positioning module 60 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., GPS receiver, real time kinematic (RTK)—GPS receiver, GLONASS, Galileo, GNSS, and/or the like and/or an accelerometer) may be included to monitor, display and/or record data regarding vehicle position and/or orientation as part of the vehicle positioning module 60.

In an example embodiment, the detection module 70 may be configured to utilize one or more sensors (e.g., of the sensor network 80) to detect objects and/or boundaries that are located in the area around the robotic vehicle 10 to enable the robotic vehicle 10 to identify the objects or boundaries with or without physically contacting them. Thus, the detection module 70 may enable object avoidance as well as allow the robotic vehicle 10 to avoid contact with boundaries, buildings, fences, and/or the like while covering the service area 20. As such, the robotic vehicle 10 (or more specifically, the control circuitry 12) may object/boundary detection information to alter a track of the robotic vehicle 10 and/or report impediments to providing full coverage of the service area 20. The detection module 70 may therefore be configured to detect static (i.e., fixed or permanent) and/or dynamic (i.e., temporary or moving) objects in the vicinity of the robotic vehicle 10. In some cases, the detection module 70 may be further configured to classify or identify the objects detected (e.g., by type, as known or unknown, as static or dynamic objects, as specific objects, and/or the like). Moreover, in some cases, the detection module 70 may interact with the vehicle positioning module 60 to utilize one or more objects to facilitate positioning or boundary definition for the robotic vehicle 10.

Various sensors of sensor network 80 of the robotic vehicle 10 may be included as a portion of, or otherwise communicate with, the detection module 70 to, for example, determine the existence of objects, determine range to objects, determine direction to objects, classify objects, and/or the like. The detection module 70 may also or alternatively enable the robotic vehicle 10 to determine precipitation conditions such as the existence of rain, snow, sleet or ice based on temperature and/or moisture detection sensors.

Figure 3:
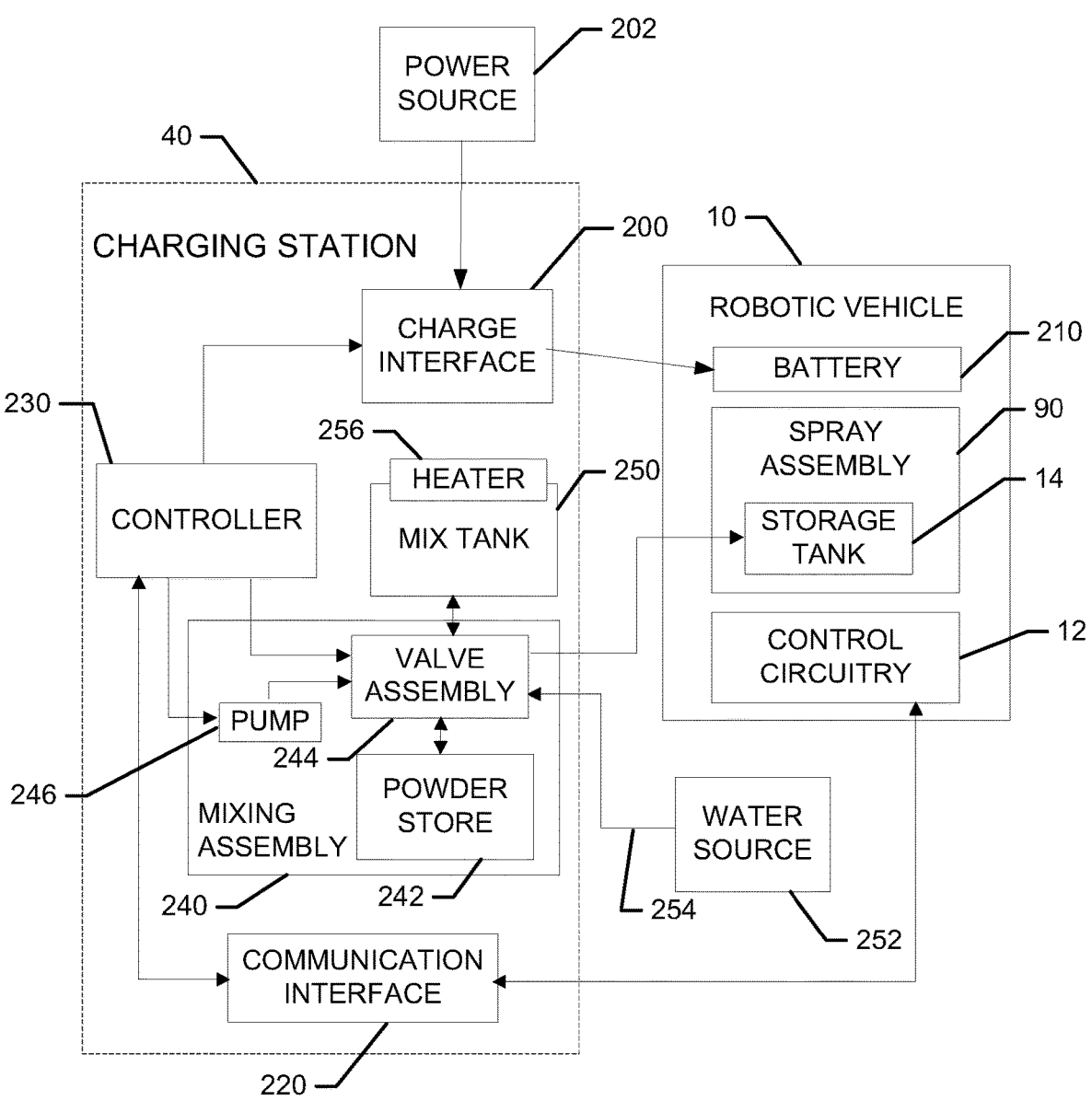
FIG. 3 illustrates a block diagram of various components that may be employed as part of a charging station in accordance with an example embodiment.

FIG. 3 is a block diagram of the charging station 40 of an example embodiment. The charging station 40 may include a charge interface 200, which includes structures and electronic components to interface with a power source 202 and a battery 210 of the robotic vehicle 10 in order to charge the battery 210 from the power source 202. The charging station 40 and the charge interface 200 may be arranged to enable the robotic vehicle 10 to drive into or proximate to the charging station 40 and engage with the charge interface 200 when parked in or at the charging station 40. For example, the robotic vehicle 10 may be guided or otherwise enter into proximity with the charging station 40 in a manner that engages charging contacts on the charge interface 200 and the robotic vehicle 10 to enable power from the power source 202 to be used to charge the battery 210 of the robotic vehicle 10.

In some cases, the charging station 40 may also be capable of communication (wired or wireless) with the robotic vehicle 10 to exchange information with and/or provide instructions to the robotic vehicle 10. In this regard, for example, the charging station 40 may include a communication interface 220 that is capable of wireless or wired communication with the control circuitry 12. The communication may include the provision of instructions to the robotic vehicle 10 and/or extraction of data from the robotic vehicle 10. In some cases, the data extracted may include sensor data obtained by the sensor network 80, and such data may be communicated to the electronic device 42 via the wireless communication network 48 (via wireless links 46).

In an example embodiment, the charging station 40 may include a controller 230. The controller 230 may include processing circuitry, which may be similar in form or structure (or at least functional capability) to the processing circuitry 110 described above in connection with the description of FIG. 2. Thus, the details of the structure and function of the controller 230 will not be repeated. The controller 230 may be configured to control communications associated with the communication interface 220 and/or control operations of the charge interface 200. However, in some cases, the charging station 40 may not include the communication interface 220 and/or the controller 230. In such examples, the corresponding components of the charging station 40 may be operated manually or locally by the operator.

In an example embodiment, the charging station 40 may also be configured to provide the deicing solution to the robotic vehicle 10. Thus, for example, the deicing solution may be transferred to the storage tank 14 of the robotic vehicle 10 while the robotic vehicle 10 is charging (or at least while the robotic vehicle 10 is operably coupled to the charging station 40). The transfer of deicing solution to the storage tank 14 may therefore happen simultaneous with charging, or sequentially before or after charging of the battery 210. A mixing assembly 240 may be included at the charging station 40 to enable mixing and creation of the deicing solution prior to provision of the deicing solution to the storage tank 14.

The mixing assembly 240 may include a powder store 242 (or solid material store), which may be a tank, container, or other holding apparatus in which a powder or solid material that mixes with water (or another liquid medium) to form the deicing solution in a mix tank 250. In an example embodiment water provision to the mix tank 250 may be controlled by a valve assembly 244 of the mixing assembly 240. The valve assembly 244 may include electronically (or manually) controlled valves that direct flow from a water source 252 into the mix tank 250. Alternatively or additionally, the valve assembly 244 may be used to control flow from the mix tank 250 to the storage tank 14 and/or within the mix tank 250.

In some examples, the water source 252 may be attached to the mix tank 250 or the valve assembly 244 via a hose connection 254. The hose connection 254 may be a common water hose, or may be heated to prevent freezing in cold temperatures. If not heated, the hose connection 254 may be manually attached for filling from the water source 252 and then disconnected thereafter in order to avoid freezing of water in the hose connection 254. The valve assembly 244 may include a fill alignment in which the valves of the valve assembly 244 are positioned to enable water to flow from the water source 252 (e.g., a spigot attached to a pressurized water supply) to the mix tank 250. In some cases, such flow may transition through the powder store 242 to transfer the powder therein into the mix tank 250. However, in other cases, the valve assembly 244 may include one or more valves that can be aligned to allow the powder to fall into the mix tank 250 (e.g., via gravity). In still other cases, the operator may simply pour or add the powder directly into the mix tank 250 so that no powder store 242 is needed at all.

Alternatively or additionally, the valve assembly 244 may have a transfer alignment in which the valves of the valve assembly 244 are positioned to enable deicing solution to flow from the mix tank 250 to the storage tank 14. Flow may be driven by a pump 246 of the mixing assembly 240. The pump 246 may be located inside or outside the mix tank 250. As yet another alternative or addition, the valve assembly 244 may have a freshening or mixing alignment in which valves of the valve assembly 244 are positioned to enable deicing solution to flow internally in the mix tank 250. The mixing alignment may, in some cases, rely on the pump 246 of the mixing assembly 240 to provide motive force for moving deicing solution within the mix tank 250. The movement of deicing solution in the mixing alignment may ensure proper mixing of the powder with water to form the deicing solution. The movement of deicing solution may also prevent settling of the powder, or otherwise prevent the powder from coming out of solution, to keep the deicing solution properly mixed and ready for use. Yet another potential advantage of the movement of the deicing solution in the mixing alignment may be to prevent freezing of the deicing solution in very low temperatures. However, in some examples, a heater 256 may be provided at the mix tank 250 in order to heat the solution therein and prevent freezing.

As can be appreciated from the description above, the deicing solution may be prepared at the charging station 40 for transfer to the robotic vehicle 10 during charging of the battery 210 of the robotic vehicle 10. However, it may also be possible to arrange the charging station 40 to interface directly with the storage tank 14 while the robotic vehicle 10 is docked at the charging station 40. In such an example, the storage tank 14 may, while docked, be operably coupled to the valve assembly 244, pump 246, and/or powder store 242 instead of the mix tank 250. Thus, for example, the storage tank 14 and mix tank 250 may effectively be the same component when the robotic vehicle 10 is docked.

Figure 4:
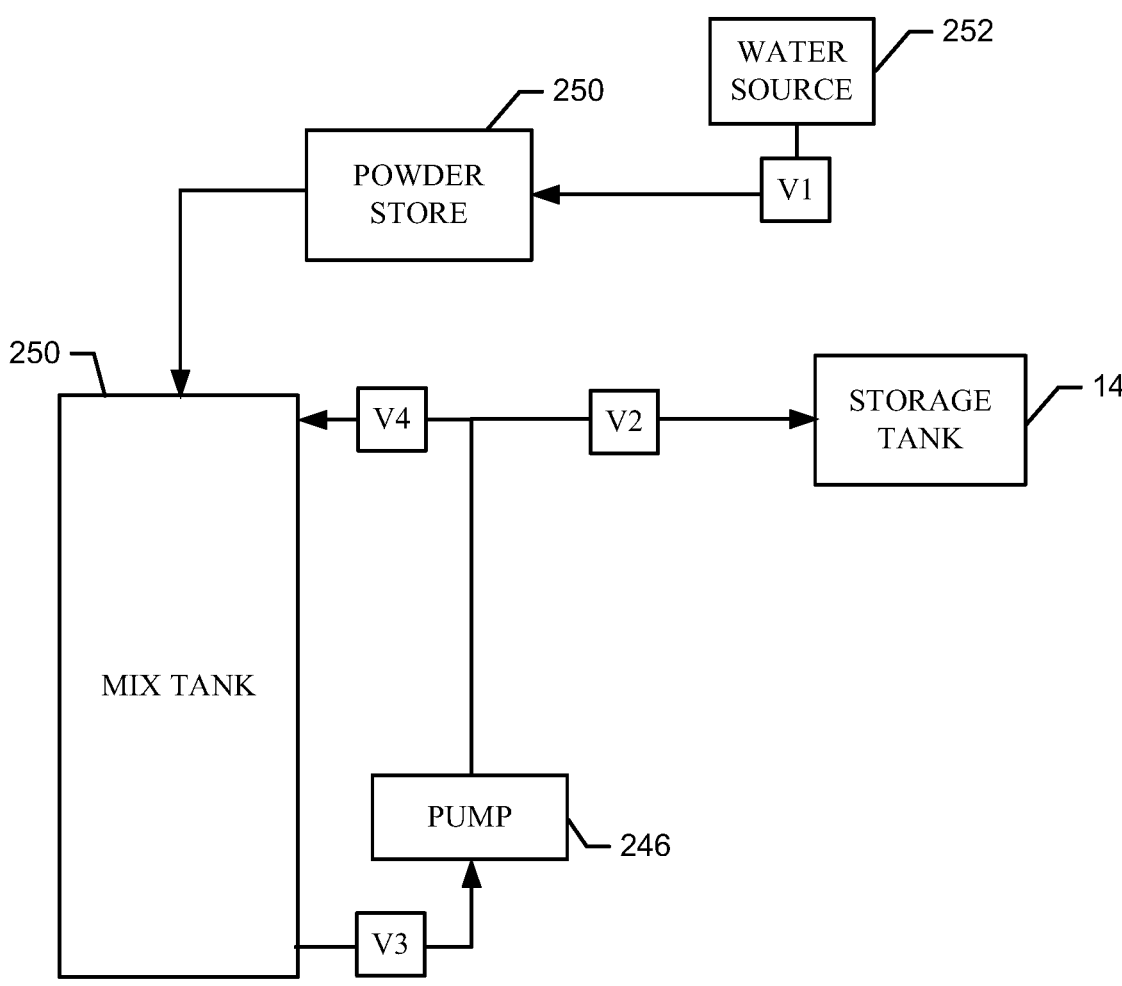
FIG. 4 illustrates a valve assembly of a mixing assembly in accordance with an example embodiment.

FIG. 4 illustrates an example arrangement for the valve assembly 244 in accordance with one example embodiment. In this regard, the valve assembly 244 of this example may include four valves (e.g., V1, V2, V3 and V4). However, alternative embodiments may include more or fewer valves.

In the fill alignment, V1 may be open and V2, V3 and V4 may each be closed. Water may be provided from the water source 252 through the valve V1 and into the powder store 250 to carry the powder with the water to the mix tank 250. However, it should be appreciated that the powder could alternatively be added directly to the mix tank 250 by the operator, and the powder store 250 could be eliminated from the example shown in FIG. 4.

In the mix alignment, V3 and V4 may be open and the pump 246 may be operating. Meanwhile, V2 and V1 may each be closed. The pump 246 may draw deicing solution from the bottom region of the mix tank 250 and circulate the deicing solution to a top region of the mix tank 250. The recirculation flow generated by this arrangement may keep the contents of the mix tank 250 from freezing in some cases. Regardless, however, the recirculation flow may provide good mixing of the deicing solution, and may prevent setting of material at the bottom of the mix tank 250 (e.g., due to the powder coming out of solution). In some cases, the mix alignment could be combined with a filling operation simply by opening V1 for a period of time to let more water into the mix tank 250 during simultaneous recirculation of the deicing solution in the mix tank 250.

In the transfer alignment, V3 and V2 may be open, and V4, and V1 may be closed. The pump 246 may draw the deicing solution from the bottom region of the mix tank 250 and move the deicing solution through V3 and V2 to the storage tank 14 of the robotic vehicle 10. It may also be possible to run the transfer alignment in parallel with filling and/or recirculation as well in some cases.

Figure 5:
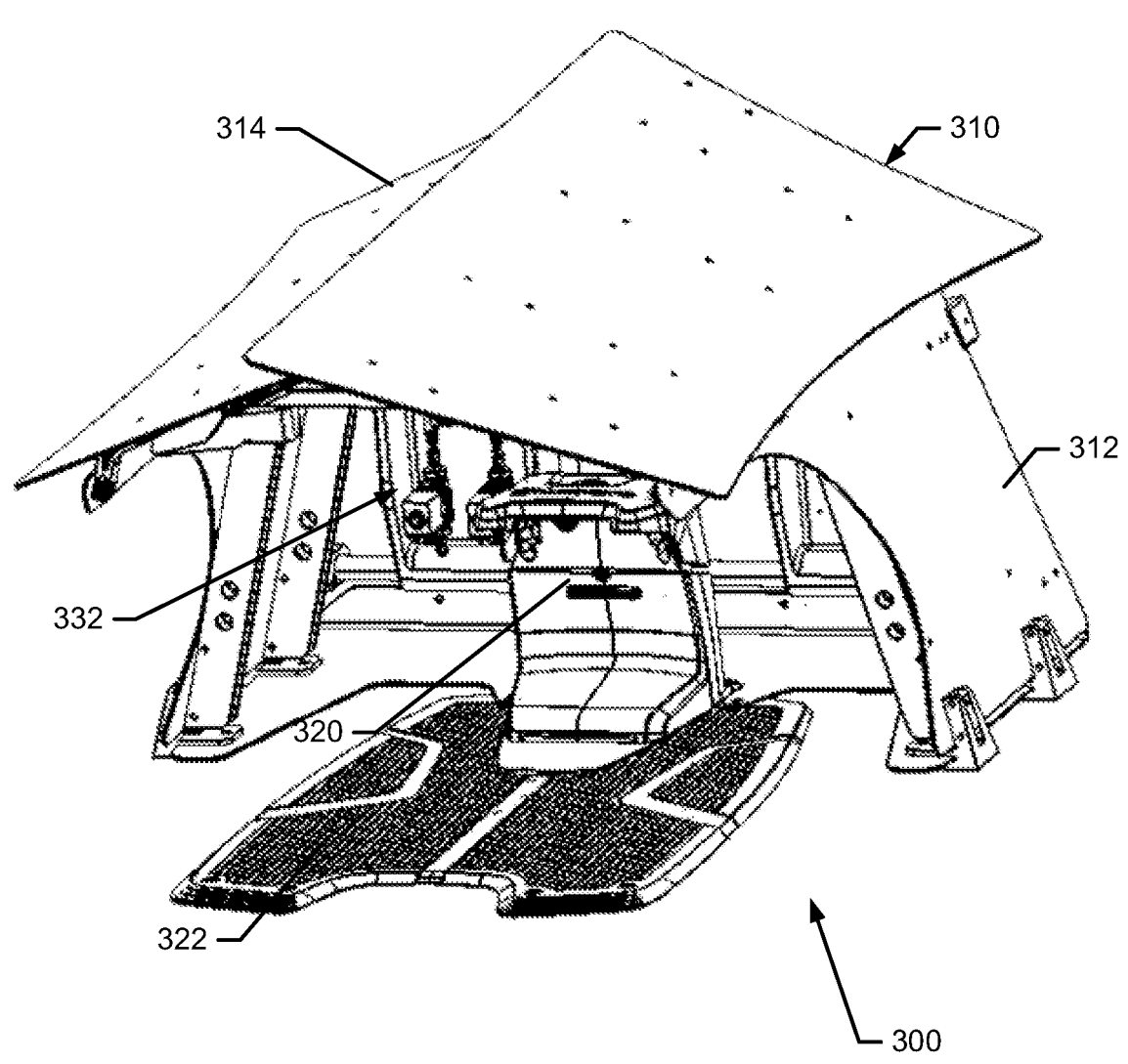
FIG. 5 illustrates a front perspective view of a charging station according to an example embodiment.
Figure 6:
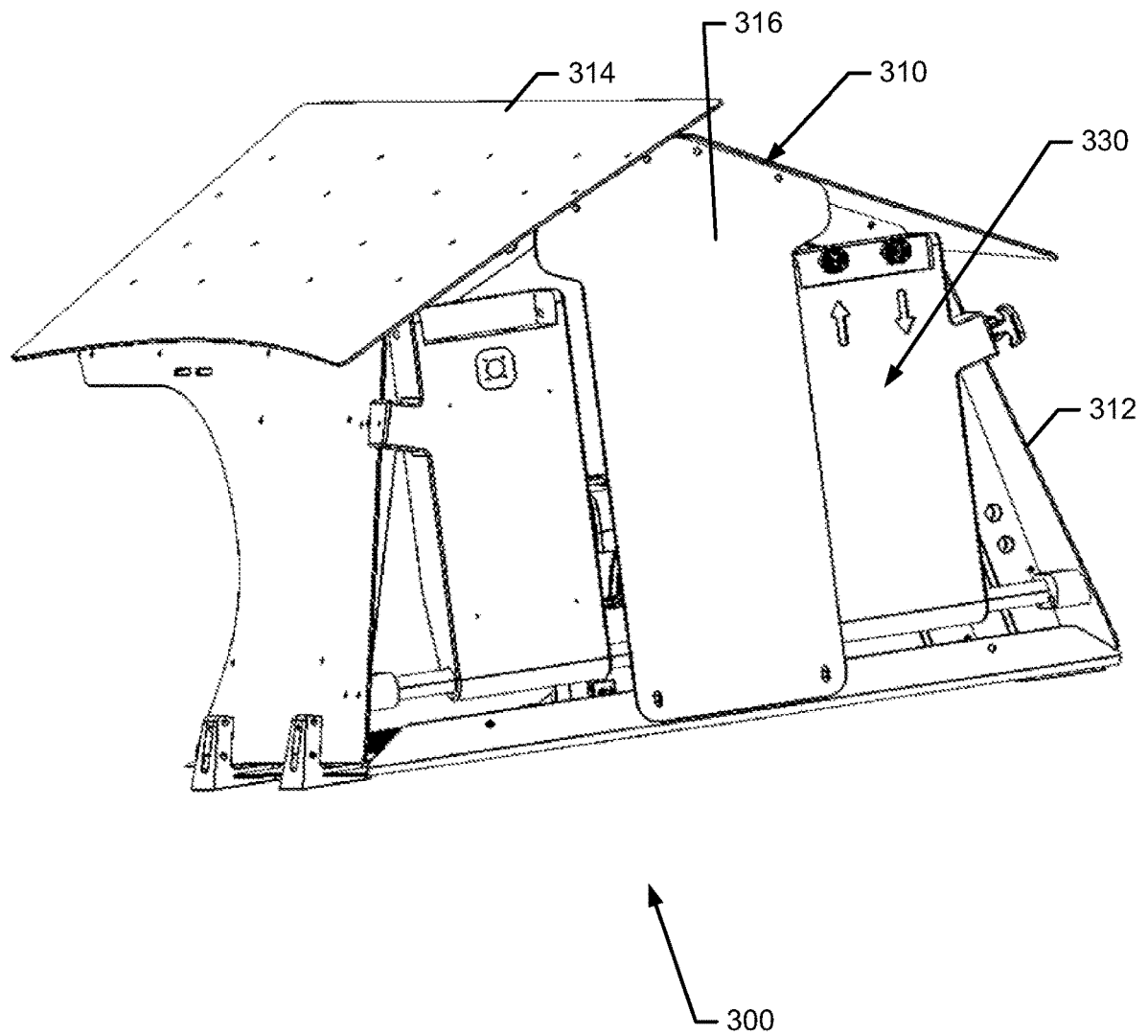
FIG. 6 illustrates a rear perspective view of the charging station according to an example embodiment.

FIG. 5 illustrates a front perspective view of one example of a charging station 300 and FIG. 6 illustrates a rear perspective view of the charging station 300 in accordance with an example embodiment. The charging station 300 is one structure that may embody the charging station 40 of FIGS. 1 and 3. However, other structures are also possible, and additions or subtractions relative to the example charging station 300 of FIGS. 5 and 6 may also be employed in some embodiments.

As shown in FIGS. 5 and 6, the charging station 300 may include a housing 310, inside which various other components of the charging station 300 may be protected from precipitation or other weather impacts. The housing 310 may also protect the robotic vehicle 10 from the elements, when the robotic vehicle is docked with the charging station 300. The housing 310 may include sidewalls 312, a roof 314 and a back wall 316. As can be appreciated from FIG. 5, the robotic vehicle 10 may enter into the housing 310 by driving in the front side of the housing 310 (which is left open) to place the robotic vehicle 10 between the sidewalls 312 and under the roof 314 when the robotic vehicle 10 is docked.

A charging tower 320 may be provided as part of the charge interface 200 of FIG. 3. The charge tower 320 may be configured to engage charging contacts on the robotic vehicle 10 to provide electrical charging of the battery 210 of the robotic vehicle 10 as described above in reference to FIG. 3. When docked, the robotic vehicle 10 may be disposed on top of a charging mat 322. The charging mat 322 may provide good traction for the robotic vehicle 10 and may, in some cases, include components that enable guidance of the robotic vehicle 10 for ensuring proper positioning during docking. The charging tower 320 and charging mat 322 may be portions of the charge interface 200 of FIG. 3

The charging station 300 may also include valve assembly 330 and hose couplers 332, which provide connections for hoses, etc., all of which may form portions of the mixing assembly 240 of FIG. 3. Thus, for example, a water hose may be attached to hose couplers 332 to provide water from a spigot for mixing at the charging station 300, and for provision to the robotic vehicle 10 along the lines described above.

Figure 7:
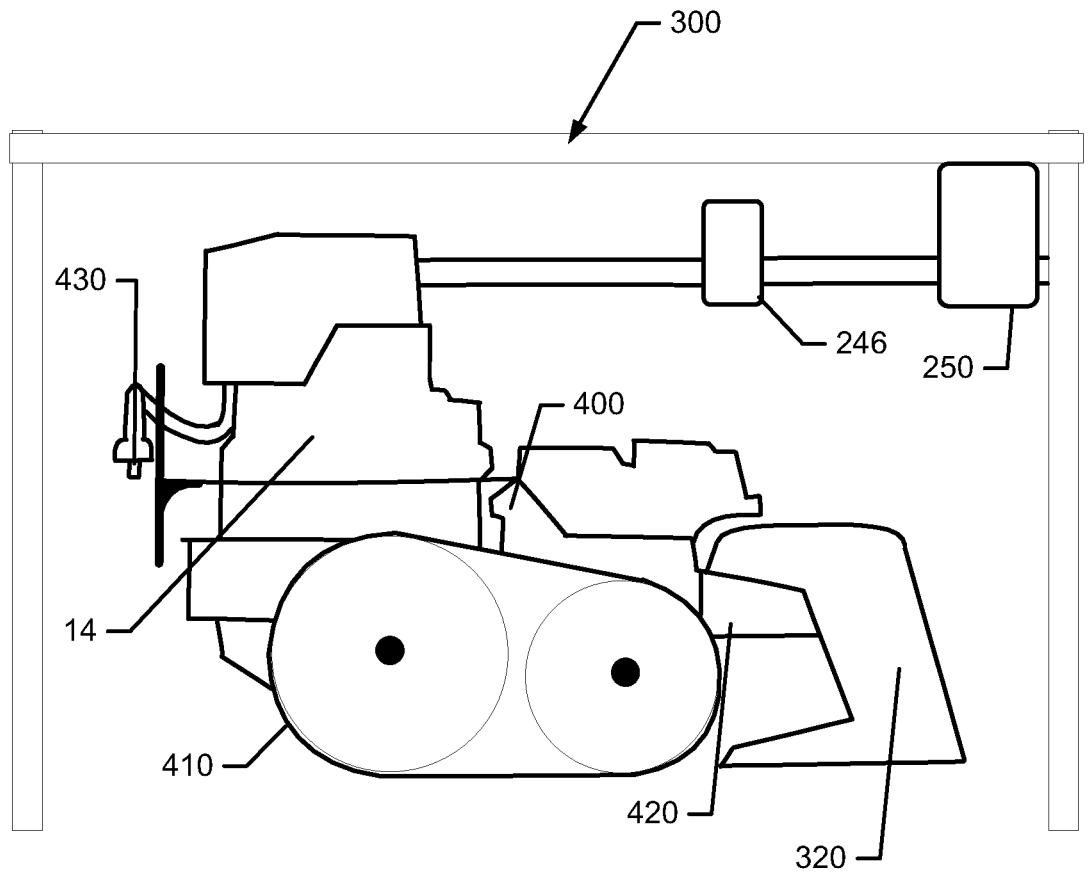
FIG. 7 shows a side view of the charging station having the robotic vehicle docked therein according to an example embodiment.

FIG. 7 shows a side view of the charging station 300 having the robotic vehicle 10 docked therein (with the charging station 300 partially cutaway to reveal the robotic vehicle 10 inside). As shown in FIG. 7, the robotic vehicle 10 may include a chassis 400 supported by a mobility assembly 410. In this example, the mobility assembly 410 includes continuous tracks. However, other means of propulsion may be employed in alternative embodiments (e.g., wheels). The robotic vehicle 10 may include a charging interface 420 disposed at one end thereof (e.g., a front end) and a nozzle 430 may be disposed at another end thereof (e.g., a rear end). The charging interface 420 may include one or more contacts that come into slidable contact with the charging tower 320 when the robotic vehicle 10 docks in the charging station 300.

In an example embodiment, a robotic vehicle charging station may be provided. The robotic vehicle charging station may include a charge interface configured to charge a battery of a robotic vehicle responsive to docking of the robotic vehicle at the charging station, and a mixing assembly configured to facilitate mixing a powder or other solid material and a liquid to form a deicing solution (or other aqueous solution) for provision to a storage tank of the robotic vehicle. The mixing assembly may include a valve assembly having a plurality of alignment states. The alignment states may include a fill alignment in which liquid from an external source is provided to the mixing assembly to be mixed with a powder to form the deicing solution, and a mixing alignment in which the deicing solution is agitated or mixed.

The robotic vehicle charging station of some embodiments may include additional features, modifications, augmentations and/or the like to achieve further objectives or enhance performance of the station. The additional features, modifications, augmentations and/or the like may be added in any combination with each other. Below is a list of various additional features, modifications, and augmentations that can each be added individually or in any combination with each other. For example, the charging station may further include a mix tank in which the powder and the liquid are mixed prior to provision to the storage tank of the robotic vehicle. In an example embodiment, the alignment states may include a transfer alignment in which the valve assembly provides for transfer of the deicing solution from the mix tank to the storage tank of the robotic vehicle. In some cases, the mixing assembly may include a pump configured to move the deicing solution in the mixing alignment or the transfer alignment. In an example embodiment, the fill alignment may direct fluid from the external source through a powder store to move the powder into the mix tank for mixing to form the deicing solution. In some cases, the mix tank may be operably coupled to a heater to prevent freezing of the deicing solution in the mix tank. In an example embodiment, the charging station may further include a controller configured to provide electronic control of valve positions of valves of the valve assembly. In some cases, the controller may be further configured to direct operation of a pump that recirculates the deicing solution in the mixing alignment. In an example embodiment, the controller may control the charge interface and the mixing assembly to simultaneously charge the battery of the robotic vehicle and fill the storage tank with the deicing solution. In some cases, the charging station may further include a communication interface configured to extract data on environmental conditions gathered by the robotic vehicle and provide the data to a remote electronic device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A robotic vehicle charging station comprising:
a charge interface configured to charge a battery of a robotic vehicle responsive to docking of the robotic vehicle at the charging station; and
a mixing assembly configured to facilitate mixing a solid material and a liquid to form a deicing solution for provision to a storage tank of the robotic vehicle,
wherein the mixing assembly comprises a valve assembly having a plurality of alignment states,
wherein the alignment states include a fill alignment in which liquid from an external source is provided to the mixing assembly to be mixed with the solid material to form the deicing solution, and
wherein the alignment states further include a mixing alignment in which the deicing solution is agitated or mixed.

2. The charging station of claim 1, further comprising a mix tank in which the solid material and the liquid are mixed prior to provision to the storage tank of the robotic vehicle.

3. The charging station of claim 2, wherein the alignment states include a transfer alignment in which the valve assembly provides for transfer of the deicing solution from the mix tank to the storage tank of the robotic vehicle.

4. The charging station of claim 3, wherein the mixing assembly comprises a pump configured to move the deicing solution in the mixing alignment or the transfer alignment.

5. The charging station of claim 2, wherein the fill alignment directs fluid from the external source through a solid material store to move the solid material into the mix tank for mixing to form the deicing solution.

6. The charging station of claim 2, wherein the mix tank is operably coupled to a heater to prevent freezing of the deicing solution in the mix tank.

7. The charging station of claim 1, further comprising a controller configured to provide electronic control of valve positions of valves of the valve assembly.

8. The charging station of claim 7, wherein the controller is further configured to direct operation of a pump that recirculates the deicing solution in the mixing alignment.

9. The charging station of claim 7, wherein the controller controls the charge interface and the mixing assembly to simultaneously charge the battery of the robotic vehicle and fill the storage tank with the deicing solution.

10. The charging station of claim 1, wherein the charging station further comprises a communication interface configured to extract data on environmental conditions gathered by the robotic vehicle and provide the data to a remote electronic device.

11. A robotic vehicle charging station comprising:
a charge interface configured to charge a battery of a robotic vehicle responsive to docking of the robotic vehicle at the charging station; and
a mixing assembly configured to facilitate mixing a solid material and a liquid to form a deicing solution for provision to a storage tank of the robotic vehicle,
wherein the mixing assembly comprises a valve assembly operably coupled to a mix tank in which the solid material and the liquid are mixed prior to provision to the storage tank of the robotic vehicle, the valve assembly controlling provision of the liquid into and out of the mix tank, and
wherein the mixing assembly further includes a pump configured to facilitate mixing of the solid material and the liquid in the mix tank.

12. The charging station of claim 11, wherein the valve assembly has a plurality of alignment states including:
a fill alignment in which liquid from an external source is provided to the mixing assembly to be mixed with the solid material to form the deicing solution,
a mixing alignment in which the deicing solution is agitated or mixed; and
a transfer alignment in which the valve assembly provides for transfer of the deicing solution from the mix tank to the storage tank of the robotic vehicle.

13. The charging station of claim 12, wherein the fill alignment directs fluid from the external source through a solid material store to move the solid material into the mix tank for mixing to form the deicing solution.

14. The charging station of claim 12, wherein the mix tank is operably coupled to a heater to prevent freezing of the deicing solution in the mix tank.

15. The charging station of claim 11, further comprising a controller configured to provide electronic control of valve positions of valves of the valve assembly.

16. A robotic vehicle charging station comprising:
a charge interface configured to charge a battery of a robotic vehicle responsive to docking of the robotic vehicle at the charging station;
a mix tank inside which an aqueous solution is stored prior to transfer of the aqueous solution to a storage tank of the robotic vehicle;
a pump; and
a valve assembly operably coupled to a mix tank and the pump to facilitate recirculation of the aqueous solution from a bottom of the mix tank to a top portion of the mix to prevent freezing of the aqueous solution or maintain mixing of the aqueous solution.

17. The charging station of claim 16, wherein the valve assembly has a plurality of alignment states including:
a fill alignment in which liquid from an external source is provided to the mix tank to be mixed with the solid material to form the aqueous solution,
a mixing alignment in which the aqueous solution is agitated or mixed in the mix tank; and
a transfer alignment in which the valve assembly provides for transfer of the aqueous solution from the mix tank to the storage tank of the robotic vehicle.

18. The charging station of claim 17, wherein the fill alignment directs fluid from the external source through a solid material store to move the solid material into the mix tank for mixing to form the aqueous solution.

19. The charging station of claim 17, wherein the mix tank is operably coupled to a heater to prevent freezing of the aqueous solution in the mix tank.

20. The charging station of claim 16, further comprising a controller configured to provide electronic control of valve positions of valves of the valve assembly.

\*  \*  \*  \*  \*